Dec. 5, 1967   C. V. FOGELBERG   3,355,769
APPARATUS FOR FORMING HOLLOW TUBING
Filed Dec. 4, 1964   2 Sheets-Sheet 1
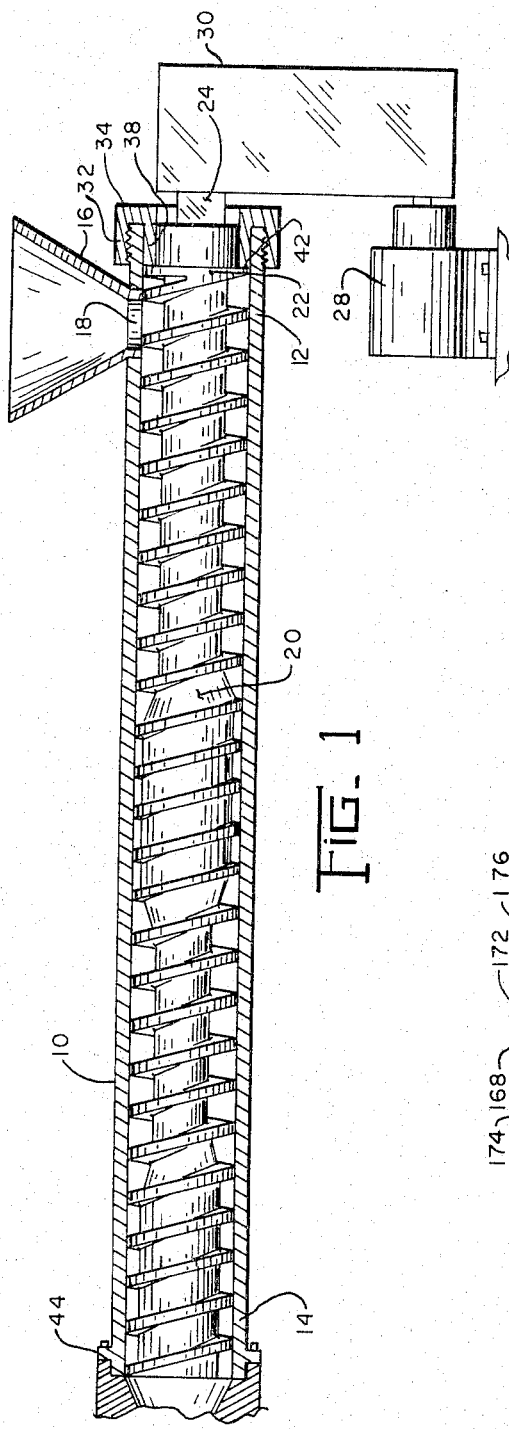
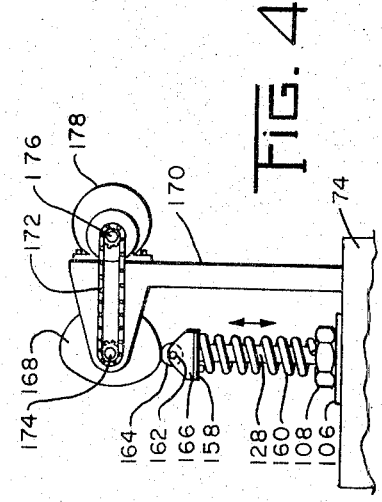
INVENTOR.
CLEMENT V. FOGELBERG
BY
ATTORNEY Dec. 5, 1967   C. V. FOGELBERG   3,355,769
APPARATUS FOR FORMING HOLLOW TUBING
Filed Dec. 4, 1964   2 Sheets-Sheet 2
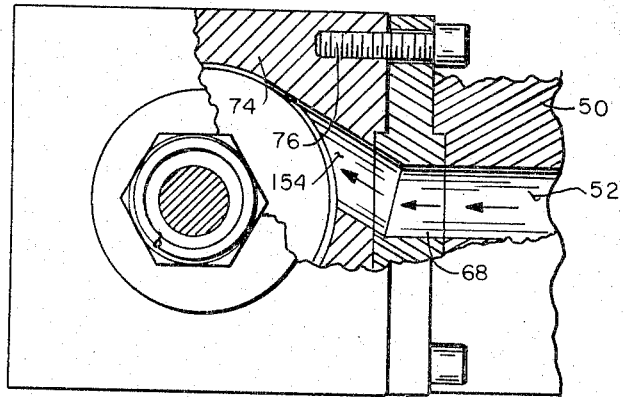
FIG_3
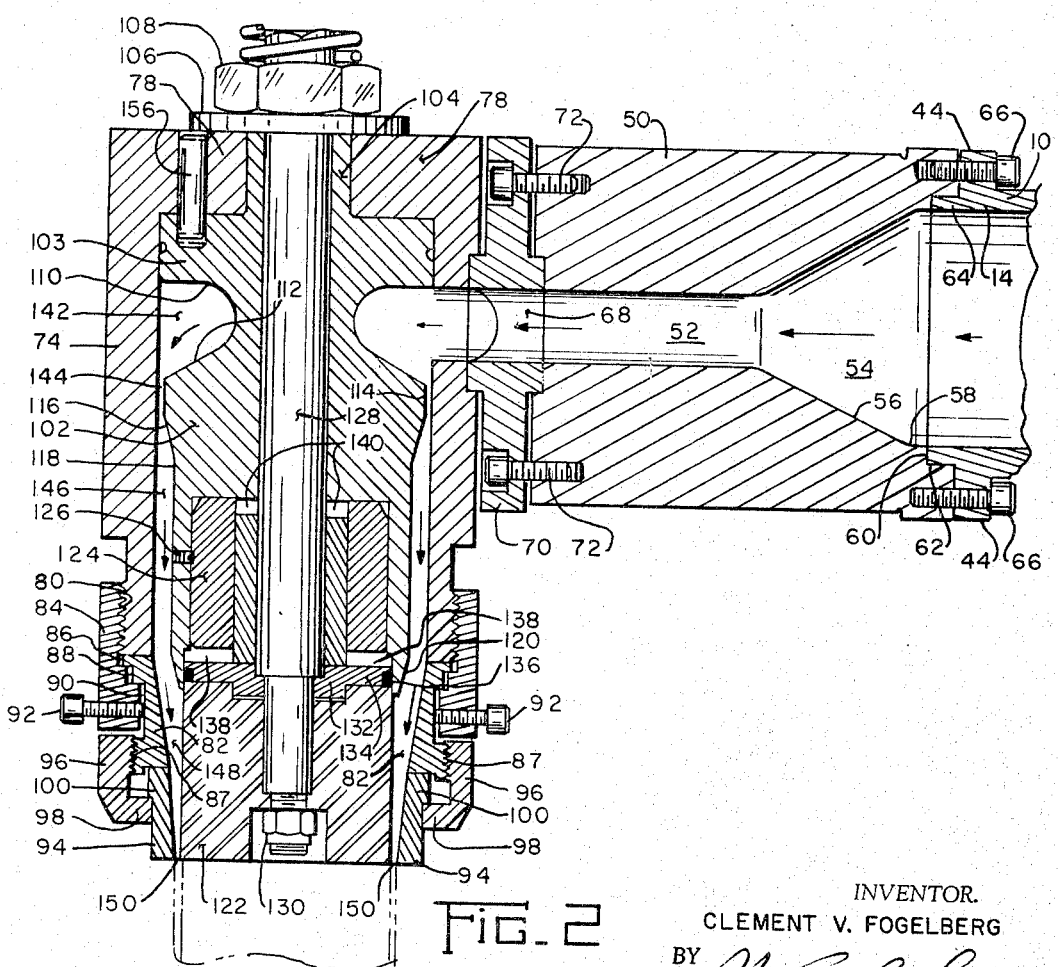
FIG_2
INVENTOR.
CLEMENT V. FOGELBERG
BY
ATTORNEY United States Patent Office 3,355,769
Patented Dec. 5, 1967

3,355,769
APPARATUS FOR FORMING HOLLOW TUBING
Clement V. Fogelberg, Boulder, Colo., assignor to Ball Brothers Research Corporation, Boulder, Colo., a corporation of Colorado
Filed Dec. 4, 1964, Ser. No. 415,998
8 Claims. (Cl. 18—14)

ABSTRACT OF THE DISCLOSURE

An extrusion apparatus having an inlet passage tangentially connected to a toroidal mixing chamber for accomplishing the method of forming hollow plastic tubing free of joinder lines by inducing peripheral flow around the chamber and thoroughly mixing such material with itself, and then forming a tube from such material in a direction along the axis around which such peripheral flow is induced.

This invention relates to an apparatus for forming tubing, and more particularly to a new, novel and improved apparatus for forming hollow tubing substantially free from defects.

One method of forming hollow tubing is by extruding flowable material into a hollow die having a mandrel supported therein, which mandrel and die define a passage having an annular cross-section. As material passes through the annular passage formed by the die and the mandrel, it is divided into several streams either by the mandrel supports or by the mandrel itself and, upon reaching the opposite side of the supports or the mandrel, whichever interferes with the unified flow of material, the material normally recombines again under tremendous pressure.

However, it has long been a problem to eliminate the marks or seams which appear in the tubing indicating where the material joined after being separated. Thus, with tubing of thermoplastic material which is cut into segments for parisons and blow molded or otherwise expanded to form hollow plastic articles, the seams or marks become very obvious defects. Not only may the articles have an unsightly appearance, but also there may be inherent weaknesses in the structure of such articles. Even if the tubing is not expanded but instead is used in the form in which it issued from an extruder nozzle, the marks or seams still cause weaknesses and unsightly defects in the tubing.

Another problem encountered with methods and apparatus presently employed to form hollow tubing, particularly when forming tubing which issues at an angle to the extruder bore, is the large amount of back pressure created which reduces the capacity or requires that a larger motor be employed to drive the extruder screw in order to cause tubing to issue from the nozzle at the same capacity. A large portion of the back-pressure is due to the choke which is employed to reweld the separated plastic stream as described above. This requires that a greater amount of power be applied to the extruder screw. Furthermore, due to the increased back-pressure and increased power applied, an excessive amount of heat is generated within the extruder, apparently explained in part by the well-known principle that pressure creates heat.

When methods and apparatus are employed which have the above-mentioned problems, the material issuing from such apparatus reaches such high temperatures during the extrusion process that either it cannot be used in the particular forming process to be employed or it results in the formation of defective articles. Thus, when such conditions occur, the only solution in the industry has been to lower the capacity of the extruder and therefore to lower the output from the extruder nozzle, in order to reduce back-pressure and to maintain the material at a workable temperature. It can readily be appreciated that due to the high cost of extrusion apparatus, a large production capacity from an extruder of a given size is essential in order to economically produce the required number of articles to realize a profit. When the above problems are present, this goal cannot be achieved. This is especially true in the light of many newly developed forming processes which are able to use much larger extruder outputs than was possible in the past.

An object of this invention is to provide an apparatus for forming tubing substantially free from marks or seams; that is, to provide a novel flow path through a nozzle through which the material is forced under pressure from an extruder, which flow path so guides and mixes the material that no marks or seams are formed and a tubing free from defects issues from the nozzle.

A further object of the present invention is to provide an apparatus for forming hollow tubing at a much higher rate and greater capacity than was previously possible with an extruder of a given size and yet which provide a higher quality thermoplastic material in good condition for forming hollow plastic articles.

An additional object of this invention is to provide an apparatus capable of achieving the above while reducing the power required to drive the screw and lowering the back-pressures within the extruder.

A still further object of this invention is to produce material from such an extruder that has a correspondingly much lower temperature than was previously possible so that the material is extruded in the proper condition for normal forming methods.

It is a still further object of the invention to achieve the above advantages without causing an increase but rather allowing a decrease in drag and back-pressure.

Additional objects and advantages of the invention will be apparent from the following detailed description of apparatus forming specific embodiments thereof when read with the appended drawings, in which:

FIGURE 1 is a sectional side elevation view of an extruder which may be employed in the invention;

FIGURE 2 is a sectional side elevation view of an extruder nozzle of the invention illustrating the tube forming portion;

FIGURE 3 is a plan view of an extruder nozzle of the invention illustrating a mixing chamber and a tangentially entering passage; and FIGURE 4 is an elevation view of programming apparatus which may be employed to control and reciprocate the mandrel and the die on the end thereof.

In accordance with the broad concept of the invention, a stream of material in a thermoplastic condition is introduced under pressure tangentially into an enlarged chamber having a forming member centrally located therein, spaced from the walls of the chamber, and having its axis perpendicular to the direction of introductory flow of the material. The material flows around the periphery of the chamber in one direction until it comes in contact with the introductory stream of material at which point the two streams of material are mixed. As material is continually introduced, pressure builds up within the chamber and forces the material to flow through a constricted annular opening formed by the walls of the chamber and the forming member axially located therein. The material is further worked during its passage through an annular flow path and extruded into the desired configuration. Due to the relatively smooth and streamlined flow path around the nozzle of the invention, a much lower pressure is required on the introductory material in order to extrude a given quantity of material. This allows a greater amount of material to be extruded while maintaining a given temperature and the reduced back-pressure enables a greater use of the potential capacity of the extruder. Furthermore, due to the intimate mixing of the two streams of material after a tangentially entering stream of material has revolved around the chamber, no marks or seams are formed in the resulting tubing.

These and additional advantages of the invention are more clearly illustrated by the following typical example and comparison of an extruder nozzle of the type previously used with a new and improved nozzle of the invention. A large number of extruder nozzles presently employed form thermoplastic material into hollow tubing in an arrangement where the tubing formed issues at right angles to a horizontal extruder. The material entering the extruder nozzle under pressure from the extruder flows directly against the mandrel and is forced to encircle the mandrel from both sides through a thin annular passage. When such a standard extrusion nozzle is employed with a three and one-half inch extruder for melting, mixing and forming thermoplastic material such as polyethylene into hollow tubing, the physical condition of the tubing is impaired by weld marks and seams caused by the recombining or rejoining of the material on the opposite side of the mandrel. Furthermore, because of the high back-pressure caused by the typical mandrel, the temperature of the issuing stock is approximately 435° F., while the back-pressure measured within the extruder at the breaker plate was approximately 6000 p.s.i. and 60 horsepower is required to drive the extruder screw. With the above conditions, the extruder was capable of extruding only approximately 300 lbs. of thermoplastic material per hour in continuous operation.

In contrast, a three and one-half inch extruder employing an extrusion nozzle of the present invention in the same manner is capable of producig thermoplastic material in the form of a hollow tubing free from weld marks or seams or other defects and at a rate of 400 lbs. per hour in continuous operation. This feat is accomplished while only requiring 59 horsepower to drive the extruder screw with a back-pressure of 4700 p.s.i. at the extruder breaker plate and a stock temperature of 400° F.

Referring now to the drawings, FIGURE 1 shows a cylindrical bore 10 having a feed end 12 and an exit end 14 and a feed hopper 16 mounted radially on the sidewall of bore 10 adjacent feed end 12. The interior of feed hopper 16 communicates with the interior of cylindrical bore 10 by means of opening 18 in the sidewall of cylindrical bore 10. A screw 20 is rotatably mounted within cylindrical bore 10 and extends from feed end 12 to exit end 14, serving as a helical screw conveying device. Adjacent the feed end of bore 10, screw 20 has a radially extending flange 22 which extends to the inside surface of bore 10. Extending from flange 22, in a direction more remote from exit end 14, is an extension shaft 24 of screw 20 which extends through feed end 12 of bore 10. A motor 28, spaced from shaft 24 is arranged to rotatably drive screw 20 within bore 10 by means of speed reducer 30 connecting motor 28 with shaft 24. A thrust bearing 32 comprises an annular disc 34 having two annular ribs 34 and 38 of different diameters extending from one side thereof forming an annular channel into which is threadedly inserted feed end 12 of bore 10. Thus, flange 38 extending inwardly into bore 10 provides a bearing surface 42 against which flange 22 on screw 20 may bear.

Material fed into feed hopper 16 passes through opening 18 into bore 10. Rotation of screw 20 compresses the material into a confining space defined by the channel of a screw 20 within the bore 10. In this manner, the material is properly mixed and melted so as to provide thermoplastic material in a condition suitable for use in a forming process at the exit end 14 of bore 10. Bore 10 has adjacent to exit end 14 a radial rib 44 on the outside thereof which is used to join bore 10 with the nozzle shown in FIGURE 2.

Referring now to FIGURES 2 and 3 of the drawings, there is shown an extension block 50 having a horizontal cylindrical passage 52 therethrough with an outwardly tapering section 54 at one end thereof, formed by a conical surface 56 connecting cylindrical passage 52 with a cylindrical surface 58 which terminates with a radially outwardly depending surface 60 which intersects a second cylindrical surface 62. Depending surface 60 and second cylindrical surface 62 form an annular recess 64 of larger diameter than that of the cylindrical section bounded by cylindrical surface 58. Annular recess 64 is designed so that the portion of the exit end 14 of cylindrical bore 10 of the extruder extending beyond radial rib 44 snugly fits within annular recess 64 so that radial rib 44 bears against the end of extension block 50. Bore 10 and extension block 50 are firmly held together by means such as bolts 66 passing through radial rib 44 and into extension block 50. This forms a sealing connection between the extension block 10 and the extruder and prevents material flowing from the extruder into extension block 10 from escaping through the connection.

An adapter 70 having an angled horizontal cylindrical passage 68 therethrough of the same diameter as cylindrical passage 52 in extension block 50 is removably attached to the opposite end of extension block 50 by bolts 72 so that passage 68 is axially aligned with passage 52. A head block 74 is attached to adapter 70 by bolts 76.

Head block 74 has an elongated cylindrical cavity of constant radius therein, the vertical axis of which is perpendicular to cylindrical passage 52 through extension block 50. The upper end of head block 74 is partially closed by an inwardly depending flange 78 leaving a passage therethrough. Head block 74 is open at its lower end and has a threaded portion 80 around the periphery of its outside surface at its lower end adjacent to said open end.

An annular die approach member 82, having an inwardly tapering passageway therethrough extending from its upper end, which passageway is substantially equal in size to the open end of head block 74, is slidably maintained against the open end of head block 72 and substantially in axial alignment therewith by an annular die approach retainer 84, which is threaded over the periphery of the threaded portion 80 of head block 74 adjacent to its open end. Adjacent to the end of head block 74, die approach member 82 has an enlarged annular lip 86 and a second annular lip 88 of smaller diameter than lip 86 and the lowermost portion of die approach member 82 has threads 87 around the periphery of its outside surface. Also, die approach retainer 84 has a series of flanges or lips of increased diameter corresponding to lip 86 and lip 88 but extending inwardly so as to engage these lips and bear against and retain die approach member 82 against the lower end of head block 74 when die approach retainer 84 is screwed by means of the threaded portion 80 onto head block 74.

A small amount of radial clearance 90 is maintained between die approach member 82 and die approach retainer 84. Die approach member 82 is firmly positioned radially by means of a plurality of set screws 92 threadedly passing through and angularly displaced around die approach retainer 84 and bearing against die approach member 82. A die 94, comprising an annular member having an inwardly tapering passageway therethrough, is axially aligned with the most inwardly tapered portion in die approach member 82, and its upper end is held against the lower end of die approach member 82 by means of die retainer 96 which is threadedly mounted on the end of die approach member 82. Die retainer 96 has an inwardly extending flange 98 at its lower end which retains an outwardly depending flange 100 extending from the upper end of die 94. Thus die approach member 82, die 94, die approach retainer 84, and die retainer 96 form a die assembly which can be employed to radially shift the position of the lowermost opening through die 94, since die 94 and die retainer 96 move radially in response to adjustment of set screws 92.

A cylindrical tube forming member 102 of varying diameter along its length is axially disposed along the cylindrical cavity within head block 74, radially displaced therefrom, and extends slightly through the lowermost open end thereof. At its upper end, member 102 has an annular enlarged portion 103 of a diameter equal to the diameter of the cylindrical cavity within head block 74 and has, adjacent the upper end of head block 74, a cylindrical portion 104 of decreased diameter which passes through inwardly depending flange 78 and has a threaded portion with threads around the outside periphery thereof extending beyond head block 74 and flange 78. A washer 106 is disposed around portion 104 and a nut 108 is threadedly fastened on portion 104 and serves to hold member 102 snugly within the upper end of head block 74.

Adjacent annular enlarged portion 103, member 102 has a radially inwardly tapering section 110 of decreased diameter which gradually changes to a section 112 of increasing diameter passing into a cylindrical section 114 of relatively constant diameter slightly less than the diameter of the cylindrical cavity within head block 74. Section 114 connects with a frusto-conical section 116 of constantly decreasing diameter which intersects and terminates at a cylindrical section 118 of relatively constant diameter which terminates in a second frusto-conical section 120 of gradually decreasing diameter.

Thus, the portion of member 102 below annular enlarged portion 103 has an outside surface comprised of a relatively straight portion, a concave arcuate portion extending about 150° and of relatively constant radius approximately equal to the radius of portion 104, a second straight portion, a third straight portion intersecting said second straight portion at an angle greater than 45°, a fourth straight portion intersecting said third straight portion at an angle at less than 45°, a fifth straight portion of relatively greater length than said previous portions and parallel to said third straight portion, and a sixth straight portion intersecting said fifth straight portion at an angle less than 45°.

Member 102 has a hollow cylindrical passage therethrough of relatively small diameter with a radially enlarged cylindrical cavity at its lower end and a second cylindrical cavity of larger diameter than the first and axially aligned therewith at its lowermost end. A die 122 having a cylindrical outside surface and a length greater than the distance between the lowermost ends of die 94 and member 102, respectively, and a diameter equal to the diameter of the lowermost cylindrical cavity in member 102 is partially inserted into this cavity, so that its lowermost end is approximately level with the lowermost end of die 94. Die 122 has a cylindrical cavity therethrough with an enlarged cylindrical cavity at its lowermost end.

An annular sleeve bearing 124 is inserted into the first radially enlarged cavity in the lower end of member 102 and prevented from rotating by a set screw 126 passing through one side of member 102. A mandrel or rod 128 extends through the cavity and member 102, and passes through die 122 into the enlarged cavity at the lowermost end thereof. A nut 130 is threadedly mounted on the lowermost end of rod 128 and removably attaches die 122 to rod 128. An adapter 132 slidably fits between sleeve bearing 124 and rod 128 and has an outwardly extending flange 134 having a recessed groove in which is disposed a ring seal 136, which ring seal and outer portion of flange 134 contact the inside surface of the lowermost open end of member 102. Clearances 138 and 140 are provided to allow vertical reciprocating movement of the rod and die assembly along with adapter 132 within the lowermost end of member 102.

Thus, it can be seen that member 102 and die 122 combine with head block 74 and its associated die assembly to form an elongated annular cavity having an upper enlarged toroidal portion 142 connecting with a constricted portion 144 connecting with elongated annular portion 146 having a greater cross-sectional area than that of constricted portion 144 passing into an inwardly tapering portion 148 of gradually decreasing cross-sectional area and terminating at an annular orifice 150. Toroidal portion 142 is connected with cylindrical passage 68 in adapter 70 by an axially-aligned tangential passage 154 more clearly shown in FIGURE 2 of the same diameter as passage 68. Member 102 is prevented from rotating within head block 74 by a pin 156 passing through the inwardly depending flange 78 of head block 74 and into member 102.

Referring now to FIGURE 4, there is shown one type of apparatus for reciprocating rod 128 within member 102 so as to vary the size and cross-sectional area of annular orifice 150. Thus, when die 94 is stationary and has a radially inwardly tapering passage therethrough, vertical reciprocation of die 122 attached to rod 128 varies the size and cross-sectional area of annular orifice 150. FIGURE 4 shows the through extending portion of rod 128 having a cap plate 158 attached to the uppermost surface thereof. Cap plate 158 retains a spring 160 in a partially compressed state helically encircling rod 128 and pressing against cap plate 158 and the top of nut 108. Cap plate 158 supports a freely rotating wheel 162 by means of an axle 164 passing through two upwardly depending flanges 166 secured to cap plate 158. A cam 168 supported by a support 170 extending upwardly from head block 74, operatively bears against wheel 164 so as to reciprocate vertically rod 128. Cam 128 is rotatably driven by means of chain 172 acting through gear 174 and gear 176, gear 176 being driven by motor 178. Cam 168 may have a predetermined shape and size and means may be provided to control the speed of motor 178 so as to increase and decrease in a preselected manner and degree the size of annular orifice 150.

An extruder nozzle employing an annular passage defined by member 102 within head block 74 and the tapered extension thereof formed by the die assembly achieves several distinct advantages over previous extrusion apparatus. It substantially reduces back-pressure within the nozzle and the extruder, thereby reducing the amount of heat generated within the extruder and increasing the capacity of the extruder of extrudate at a workable temperature. It further causes a greater amount of mixing to occur within portions of the passage, thereby substantially eliminating the formation of any weld marks or seams in an extruded object with their inherent weaknesses. In large measure, this latter advantage is achieved by introducing material tangentially from the extruder through extension block 50, adapter 70, and into the enlarged toroidal portion 142 of the chamber or annular cavity defined by member 102 within head block 74. Initially, the material is forced around the periphery of chamber 142 substantially in one direction and is caused to mix with material already present in the chamber. In this manner, marks and seams are substantially eliminated due, in part, to the tangential introduction of material into the chamber. Pressure is maintained by continuing to introduce material into chamber 142 and a portion of the material mixing within chamber 142 is forced to flow through the constricted annular opening 144 and collected in a second chamber 146. In chamber 146, the material is mixed and stabilized to eliminate residual stresses, and forced inwardly through annular opening 150.

Due to residual stresses created in material such as thermoplastic resins during an extrusion process, the extrudate issuing from a die has a tendency to warp or curl up in one direction in order to relieve such stresses. The adjustable feature incorporated in the die assembly can be used to straighten the issuing tube of extrudate and substantially eliminate any curling or deformation, since die 94 can be radially moved relative to the position of die 122, thereby narrowing the constriction of one side and reducing the force and amount of material issuing on that side, to compensate and straighten the tubing.

The invention provides means for reducing the back-pressure within the extruder, and therefore reduces the amount of wear on the extruder screw bearings as well as the amount of heat created therein. Furthermore, by introducing the material int oa large cavity and forcing it to mix therein, the weld line is substantially eliminated from the tubing or articles formed thereby. Although preferable results have been obtained by employing a toroidal cavity 142 such as that shown in the drawings and a tangentially entering passage 154, it should be understood that the invention could be employed to produce hollow extrusions of many varied shapes and sizes free from weld marks or seams in the manner of the invention by merely changing the shape of the annular passageway to correspond to the desired shape. However, it is preferable that the material be introduced so as to be forced around the periphery of a given enlarged cavity. Although tubing may be formed free from welds and seams by employing only a tangential passageway leading into a first toroidal chamber 142 and then forcing the material directly through an annular die appended to annular constriction 144, preferable results are obtained by employing the second enlarged mixing or collection chamber 146 in order to more thoroughly eliminate residual stresses in the material being extruded, as well as to thoroughly work and mix the rejoined material.

Typical apparatus previously employed for forming tubing in the general manner of the invention used with a three and one-half inch diameter extruder employs a three-quarter inch diameter passage 52 in extension block 10, and material is directed substantially perpendicularly against member 102 in order to be forced into an annular passageway and around member 17. Such an annular passageway typically has a thickness of between ⅛ inch and 5/32 inch. This normally passes into a constricted annular opening having a cross-sectional area equal to .29 square inch and then into an inwardly tapered extrusion die. Tubing formed by such an extruder head had well defined weld marks or seams which caused weaknesses and defects in the tubing and articles formed from the tubing. Back-pressures measured within the extruder at the breaker plate were measured and found to be approximately 5,000 to 6,000 pounds per square inch. Furthermore, the power required to drive the extruder screw was 60 horsepower for normal operation.

In contrast, a comparison of results obtained by apparatus constructed in accordance with the present invention will illustrate the tremendous advantages provided. For a three and one-half inch diameter extruder identical to the one employed with the above described apparatus, the passage through extension block 10 was increased to one inch in order to reduce back-pressure. The extrudate was tangentially introduced into a toroidal chamber 142 having a depth of about 1½ inches in order to further reduce back-pressure and increase mixing. Thus, it is preferable that the smallest diametric dimension of the chamber 142 be at least as large as the largest diametric dimension of the incoming stream of material or passage 154. Material from chamber 142 was forced through a constricted annular opening 144 having a thickness of ⅛ inch and then into a second extending enlarged mixing chamber 146 before passing through the final extrusion die via annular orifice 150. The back-pressure measured on the extruder employing such an extruder nozzle was consistently between 2,000 and 3,000 pounds per square inch while the power necessary to drive the extruder screw for normal operation was 59 horsepower. Even more significantly, tubing formed by this extrusion nozzle showed practically no evidence of any weld marks or seams and could freely be expanded without showing signs of weakness.

Thus, it can be seen from the above discussion and the drawings that the method and apparatus of the present invention can be used to form hollow plastic tubing while substantially eliminating any weld marks or seam formed when the material is divided within the extruder head. Furthermore, the method and apparatus of the present invention provide a means for reducing the back-pressure on the extruder screw, thus reducing the heat generated. Therefore, the apparatus can be employed with extruders driven with much power while producing the same amount of material as before.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for forming hollow tubing comprising a hollow body portion, a forming member extending longitudinally within and radially spaced from said hollow body portion defining a substantially toroidal cavity, an inlet passage tangentially connected to said chamber, an outlet passage opening from said mixing chamber parallel to the axis of said toroid, and an annular extrusion die at the outlet portion of said outlet passage.

2. Apparatus for forming hollow tubing comprising a hollow body portion, a forming member extending longitudinally within and radially spaced from said hollow body portion defining a substantially toroidal cavity, an inlet passage connected to said chamber which passage is substantially tangential to said chamber and positioned to provide initial flow of said material around the periphery thereof, a constricted annular outlet passage from said chamber, the axis of said outlet passage being substantially co-existent with the axis of said toroid, an annular mixing chamber connected to said outlet passage, and an annular extrusion die connected to and communicating with said annular mixing chamber.

3. Apparatus for forming hollow tubing comprising a hollow body portion, a forming member extending longitudinally within and radially spaced from said hollow body portion, said member and said body portion defining a substantially toroidal cavity and a first annular passage connecting said toroidal cavity with an extrusion die, said body portion having an inlet passage tangentially connected to said toroidal cavity.

4. Apparatus for forming hollow tubing comprising a hollow body portion having an open end and a closed end, a forming member having a base and extending longitudinally and axially within and radially spaced from said hollow body portion and supported only by said base at said closed end, said member having an annular recess near the base thereof and defining with said body portion a substantially toroidal cavity, and a first annular passage connecting said toroidal cavity with an extrusion die, said body portion having adjacent to said closed end an inlet passage connected tangentially to said toroidal cavity.

5. Apparatus for forming hollow tubing comprising a hollow body portion having an open end and a closed end, a forming member extending from said closed end within and radially spaced from said body portion defining a first passage and an annular opening from said body portion, said first passage comprising an enlarged toroidal portion, a constricted portion, and an expanded portion and an extrusion die connected to said first passage at the portion thereof remote from said annular opening, said hollow body portion having adjacent to said closed end an inlet passage opening tangentially into said toroidal portion at a point remote from said annular opening.

6. Apparatus for forming hollow tubing comprising a hollow body portion having an open end and a closed end, a forming member having a base and secured by said base to said closed end, said member extending from said closed end longitudinally and axially within and radially spaced from said hollow body portion, said member and said hollow body portion defining a toroidal cavity and an annular flow path, said annular flow path connecting said toroidal cavity with the atmosphere, said member cooperating with said open end to form an annular orifice, said annular flow path having a constricted annular section adjacent to said toroidal cavity and an elongated annular section of increased volume adjacent to said annular orifice, said sections being connected to said toroidal cavity and to each other by means of transition sections, said body portion having adjacent to said closed end thereof a passage tangentially connected to said cavity and arranged so that entering material will be directed around said member along the periphery of said cavity and mixed with material present in said cavity, the tubular cross-sectional area of said toroidal cavity being at least as large as the cross-sectional area of said passage.

7. Apparatus for forming hollow tubing comprising a hollow body portion having an open end and a closed end, a forming member having a base secured to and forming in part the closure of said end, said member extending from said closed end longitudinally and axially within and radially spaced from said hollow body portion, said member and said hollow body portion defining a toroidal cavity and an annular flow path, an extrusion die removably attached to said open end of said hollow body portion and cooperating with said forming member to form an annular orifice, die support means arranged so that said extrusion die may be radially shifted relative to the flow path of said material, said body portion having adjacent to said closed end thereof a passage tangentially connecting said cavity with a source of material under pressure and arranged so that entering material will be directed around said forming member along the periphery of said cavity and mixed with material present in said cavity, the tubular cross-sectional area of said toroidal cavity being at least as large as the cross-sectional area of said passage.

8. Apparatus for producing thermoplastic extrudate in the form of a tube free from defects comprising an extruder having a cylindrical bore with a feed end and an exit end, a feed hopper mounted upon said extruder at said feed end and arranged to insert particulate material into said bore, an extruder screw mounted within said bore and arranged for axial rotation within said bore, sealing means disposed between said bore and said screw at said feed end of said bore, driving means to rotate said screw within said bore, an extruder nozzle attached to the exit end of said bore, said nozzle comprising an adapter having a first passage therethrough, which passage has nearest said exit end an inwardly tapering section and a section of constant radius extending through the remainder of said adapter, a head block having an elongated cylindrical cavity therethrough and an open end, said head block being attached to said adapter, a die assembly attached to said head block at said open end and forming an axially aligned inwardly tapered extension of said cylinder cavity, a cylindrical forming member axially extending from the end of said head block most remote from said open end and extending through said open end of said head block, a die member removably secured to the through-extending end of said forming member and extending within said axially aligned inwardly tapered extension of said cylindrical cavity, an annular orifice defined by said die member and, said die assembly, forming member with associated die member and said head block with associated die assembly defining an annular flow path, said annular flow path having from the end most remote from said open end an enlarged toroidal section, a constricted section, a second enlarged section smaller than said toroidal section, and an inwardly tapering section terminating in an annular orifice, said head block having adjacent to said enlarged toroidal section a second passage for tangentially introducing material under pressure into said enlarged toroidal section, said second passage axially aligned with the passage through said adapter.

References Cited
UNITED STATES PATENTS

| 3,019,481 | 2/1962 | Negoro | 18—14 X |
| 3,186,032 | 6/1965 | Harwood | 18—14 |
| 3,205,534 | 9/1965 | Langecker | 18—14 |
| 3,209,404 | 10/1965 | Hagen | 18—14 |
| 3,218,672 | 11/1965 | Langecker | 18—14 |

FOREIGN PATENTS 823,066  11/1959  Great Britain.

ROBERT F. WHITE, *Primary Examiner.*

L. S. SQUIRE, T. J. CARVIS, *Assistant examiners.*